(12) United States Patent
Yang

(10) Patent No.: US 9,915,974 B2
(45) Date of Patent: Mar. 13, 2018

(54) ELECTRONIC DEVICE

(71) Applicant: Lenovo (Beijing) Co., Ltd., Beijing (CN)

(72) Inventor: Guang Yang, Beijing (CN)

(73) Assignee: Lenovo (Beijing) Co., Ltd., Beijing (CN)

( * ) Notice: Subject to any disclaimer, the term of this patent is extended or adjusted under 35 U.S.C. 154(b) by 33 days.

(21) Appl. No.: 14/150,152

(22) Filed: Jan. 8, 2014

(65) Prior Publication Data

US 2014/0192017 A1 Jul. 10, 2014

(30) Foreign Application Priority Data

Jan. 9, 2013 (CN) .......................... 2013 1 0008194

(51) Int. Cl.
*G06F 1/16* (2006.01)
*G06F 3/14* (2006.01)
*G09G 3/34* (2006.01)

(52) U.S. Cl.
CPC .......... *G06F 1/1616* (2013.01); *G06F 1/1618* (2013.01); *G06F 1/1647* (2013.01); *G06F 3/1423* (2013.01); *G09G 3/34* (2013.01)

(58) Field of Classification Search
CPC .... G06F 1/1423; G06F 1/1647; G06F 1/1641; G06F 1/1692; G06F 1/1649; G06F 3/1431; G06F 3/1438; G06F 3/1423; G06F 2203/04803; G06F 2203/04804; G06F 2203/04102; G06F 15/0291; G06F 2200/1637; H04M 2250/12; H04M 2250/16; H04M 2250/52; G09G 2380/02; G09G 2380/14; G09G 2360/04; G09G 5/14; G09F 9/301; G02F 2201/44;
(Continued)

(56) References Cited

U.S. PATENT DOCUMENTS 6,343,006 B1 1/2002 Moscovitch et al.
7,136,282 B1 11/2006 Rebeske
2007/0080892 A1 4/2007 Rebeske
(Continued)

FOREIGN PATENT DOCUMENTS

CN 1902563 A 1/2007
WO WO-2005067479 A2 7/2005

OTHER PUBLICATIONS

First Chinese Office Action regarding Application No. 201310008194.5 dated Jun. 13, 2016. English translation provided by Unitalen Attorneys at Law.

*Primary Examiner* — Grant Sitta
*Assistant Examiner* — Amen Bogale
(74) *Attorney, Agent, or Firm* — Harness, Dickey & Pierce, P.L.C.

(57) ABSTRACT

An electronic device is provided, the electronic device includes a first display screen and a second display screen, the first display screen and the second display screen are articulated to the same side of a control system, and can rotate up and down, and can display page information, the page information displayed by the first display screen and the second display screen is the same or different according to a selection of a user. The two display screens of a display apparatus can display page information for the user in multiple display forms and display modes, which greatly enriches the display manner of the electronic device and improves user experience.

5 Claims, 3 Drawing Sheets

US 9,915,974 B2
Page 2

(58) Field of Classification Search
CPC ............... H04N 5/23293; A63F 13/26; A63F 2300/301; H01L 27/3267
USPC ......................................................... 345/173
See application file for complete search history.

(56) References Cited

U.S. PATENT DOCUMENTS

| | | | | |
|---|---|---|---|---|
| 2008/0068292 A1* | 3/2008 | Yuan | G06F 3/1438 | 345/2.1 |
| 2010/0182265 A1* | 7/2010 | Kim | G06F 1/1616 | 345/173 |
| 2010/0227642 A1* | 9/2010 | Kim | H04M 1/0256 | 455/556.1 |
| 2011/0109567 A1* | 5/2011 | Kim | G06F 1/1641 | 345/173 |
| 2011/0122107 A1* | 5/2011 | Onkura | G06F 1/1616 | 345/207 |
| 2011/0187662 A1* | 8/2011 | Lee | G06F 1/1641 | 345/173 |
| 2011/0248967 A1* | 10/2011 | Wang | G09G 3/344 | 345/204 |
| 2012/0050324 A1* | 3/2012 | Jeong | G06F 17/30 | 345/633 |
| 2012/0060089 A1* | 3/2012 | Heo | G06F 1/1647 | 715/702 |
| 2012/0200487 A1* | 8/2012 | Dvorak | G06F 3/0362 | 345/156 |
| 2012/0206386 A1* | 8/2012 | Xu | G06F 1/1616 | 345/173 |
| 2012/0229399 A1* | 9/2012 | Kobayashi | G06F 3/0486 | 345/173 |
| 2013/0050164 A1* | 2/2013 | Rericha | G06F 1/1626 | 345/205 |
| 2013/0285881 A1* | 10/2013 | Loo | G06F 3/1423 | 345/1.1 |
| 2013/0314338 A1* | 11/2013 | Nam | G06F 3/041 | 345/173 |

* cited by examiner

ELECTRONIC DEVICE

CROSS REFERENCE TO RELATED APPLICATION

This present application claims the priority to Chinese Patent Application No. 201310008194.5, filed with the State Intellectual Property Office on Jan. 9, 2013, entitled as "ELECTRONIC DEVICE", the entire contents of which is hereby incorporated by reference in its entirety.

BACKGROUND

Field of the Disclosure

The disclosure relates to the field of computer technology, and particularly to an electronic device.

Background of the Technology

A laptop computer, as a portable electronic product, has already become an indispensable part in life and work of more and more users. With the diversity of applications of the computer and the enrichment of contents of applications of the computer, the users of the laptop computer are increasingly able to appreciate the convenience and the practicability of the laptop computer.

In the practical application of the laptop computer, multiple applications run simultaneously, or multiple pages are opened simultaneously by a user. The user may simultaneously pay attention to more than one application or more than one page which are being used. However the laptop in the prior art can not display two interfaces simultaneously, or can present multiple pages on a display screen simultaneously only by a method of zooming out the area of a displayed page. The method provides a poor experience to the user and is inconvenient to use. Furthermore, most display screens of the laptop computers in the prior art are liquid crystal display screens, which have a single and boring display form and display mode.

SUMMARY

In view of this, embodiments of the disclosure provide an electronic device to display page information for a user in multiple display forms and display modes to enrich a display manner of the electronic device.

In order to realize the objects described above, the disclosure provides technical solutions as follows:

an electronic device, including a first display screen and a second display screen; wherein the first display screen and the second display screen are articulated to the same side of a control system; the first display screen and the second display screen are configured to, in a case that both the first display screen and the second display screen are in an operating state, display page information, and the page information displayed by the first display screen and the second display screen is the same or different according to a selection signal of a user.

Optionally, the first display screen is an electronic paper screen, and the first display screen is rotatable about an axis at the articulation position and is fixable at any position within a rotation range of the first display screen;

the second display screen is an organic light-emitting diode display screen, and the second display screen is rotatable about an axis at the articulation position and is fixable at any position within a rotation range of the second display screen.

Optionally, the second display screen is a transparent light-emitting diode display screen.

Optionally, the first display screen and the transparent light-emitting diode display screen are configured to cooperate with each other to display paper information in the case that both the first display screen and the transparent light-emitting diode display screen are fixed at a position with the same angle.

Optionally, the first display screen is configured to display first page information; the transparent light-emitting diode display screen is configured to display second page information; the first page information is different from the second page information.

Optionally, the transparent light-emitting diode display screen is configured to display page information; the first display screen is configured to provide a color background to the transparent light-emitting diode display screen.

Optionally, the transparent light-emitting diode display screen includes a camera;

the camera is configured to, in a case that an open angle of the first display screen is greater than or equal to a preset threshold and an open angle of the transparent light-emitting diode display screen is within a preset range, collect an image in a field of vision of the camera and send the image to the control system;

the transparent light-emitting diode display screen is configured to display information related to the image after the image is identified by the control system.

Optionally, the second display screen is a transparent touch display screen;

The transparent touch display screen is configured to display an image of an input apparatus of the control system in the case that the transparent touch display screen is fixed onto the input apparatus, to receive triggering information about triggering made to the image by the user and to send the triggering information to the control system to make an operation of the user identified by the control system according to the triggering information and the correspondence between the image and the input apparatus.

Optionally, the triggering information includes:

capacitive triggering information, infrared triggering information and ultrasonic triggering information.

Optionally, the electronic device further includes:

a first hall-effect switch corresponding to the first display screen and a second hall-effect switch corresponding to the second display screen; wherein the first hall-effect switch is configured to sense an open angle of the first display screen and the second hall-effect switch is configured to sense an open angle of the second display screen, and a display mode of the first display screen and a display mode of the second display screen is controlled according to different combinations of the open angle of the first display screen and the open angle of the second display screen.

It should be known from the technical solution described above that, compared with the prior art, the embodiments of the disclosure disclose an electronic device, and the electronic device includes a first display screen and a second display screen, wherein the first display screen and the second display screen are articulated to the same side of a control system, and can rotate up and down, and can display the same or different page information according to a selection of a user. The two display screens of the display apparatus can display page information for the user in multiple display forms and display modes, which greatly enriches the display manner of the electronic device and improves user experience.

BRIEF DESCRIPTION OF THE DRAWINGS

In order to more clearly illustrate the technical solution in the embodiments of the disclosure or in the prior art, in the following, accompanying drawings required in the description of the embodiments or the prior art will be briefly described. Apparently, the accompanying drawings in the following description are just the embodiments of the disclosure. For those skilled in the art, other accompanying drawings can also be obtained according to the accompanying drawings provided without any creative work.

DETAILED DESCRIPTION

In the following, the technical solution in the embodiments of the disclosure will be described clearly and completely in conjunction with the accompanying drawings in the embodiments of the disclosure. Apparently, the described embodiments are just a part of embodiments of the disclosure, and are not all embodiments. All other embodiments obtained by those skilled in the art based on the embodiments of the disclosure without any creative work will fall within the scope of protection of the disclosure.

Figure 1:
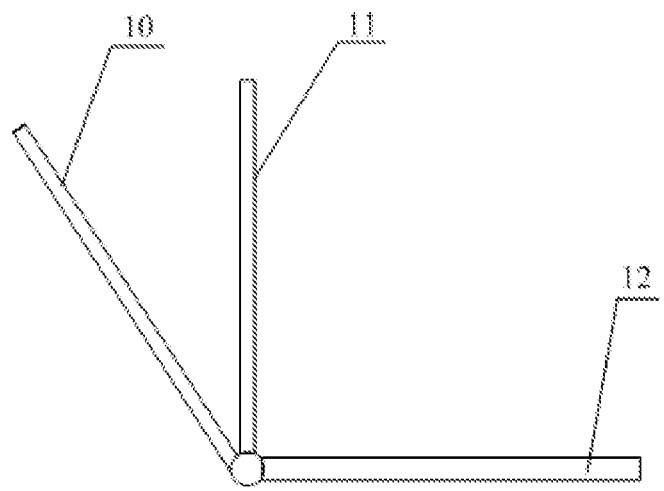
FIG. 1 is a schematic structural diagram of an electronic device according to an embodiment of the disclosure.

FIG. 1 is a schematic structural diagram of an electronic device according to an embodiment of the disclosure. As shown in FIG. 1, the electronic device may include a first display screen 10 and a second display screen 11.

The first display screen 10 and the second display screen 11 are articulated to the same side of a control system 12; the first display screen 10 and the second display screen 11 is configured to, in a case that both the first display screen 10 and the second display screen 11 are in an operating state, display page information, and the page information displayed by the first display screen 10 and the second display screen 11 is the same or different according to a selection signal of a user.

Here, the first display screen 10 may be an electronic paper screen, the second display screen 11 may be an organic light-emitting diode display screen, both the first display screen 10 and the second display screen 11 can rotate about an axis where they are articulated to the control system 12 and can be fixed at any position within a rotation range thereof.

Figure 2:
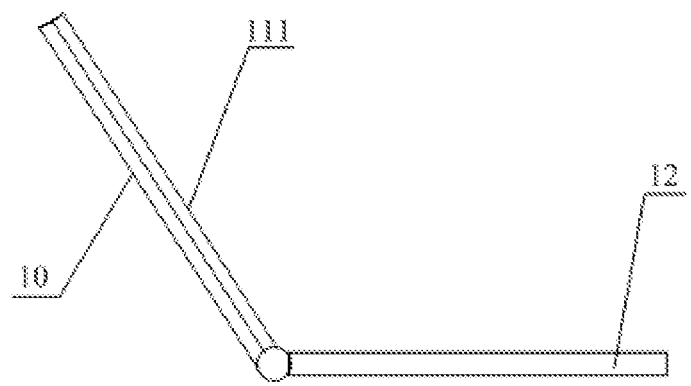
FIG. 2 is a schematic diagram showing a display status of an electronic device according to an embodiment of the disclosure.

FIG. 2 is a schematic diagram showing a display status of an electronic device according to an embodiment of the disclosure. As shown in FIG. 2, in a schematic example, the second display screen may be a transparent light-emitting diode display screen 111. In FIG. 2, the first display screen 10 and the transparent light-emitting diode display screen 111 have the same rotation angle, and are fixed at a position with the same angle. In this case, the first display screen 10 and the transparent light-emitting diode display screen 111 are configured to cooperate with each other to display page information. There may be two display modes, which will be introduced in the following respectively.

In a case that the first display screen 10 an the transparent light-emitting diode display screen are fixed at a position with the same angle, one display mode is that the first display screen 10 may display first page information and the transparent light-emitting diode display screen may display second page information. The first page information is different from the second page information. For example, the first page information is image information which is a pyramid, and the second page information is text information related to the image information, e.g., the text information is that "the pyramid built in the desert and having a delicate structure and a grand appearance is a representative work of the Ancient Egyptian Civilization and the symbol of the Egypt". The text information displayed on the transparent light-emitting diode display screen 111 may be located around or at one side of the image displayed on the first display screen 10, and does not cover the image information displayed on the first display screen 10. A hybrid display of the first display screen 10 and the transparent light-emitting diode display screen 111 may be realized in the display mode described above.

Another display mode is that the transparent light-emitting diode display screen 111 displays page information; and the first display screen 10 provides a color background to the transparent light-emitting diode display screen. Since the transparent light-emitting diode display screen is transparent, then in a certain environment condition, an actual object behind the transparent light-emitting diode display screen may be viewed through the transparent light-emitting diode display screen, thus the actual object will have an influence on an effect of viewing the information displayed on the transparent light-emitting diode display screen 111. In a case that the first display screen 10 and the transparent light-emitting diode display screen 111 are fixed at the position with the same angle, the first display screen 10 may be controlled to display a fixed color, which provides a color background to the information displayed on the transparent light-emitting diode display screen 111. Considering the display effect, the color of the first display screen 10 may be set to be black or white.

Figure 3:
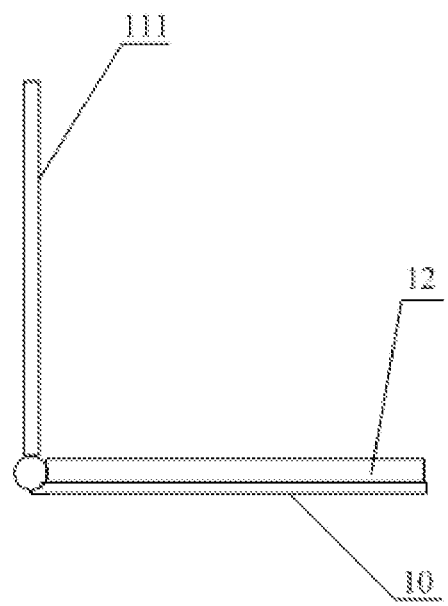
FIG. 3 is a schematic diagram showing another display status of an electronic device according to an embodiment of the disclosure.

FIG. 3 is a schematic diagram showing another display status of an electronic device according to an embodiment of the disclosure. As shown in FIG. 3, in a schematic example, the second display screen is a transparent light-emitting diode display screen 111. A camera is configured to collect an image in a field of vision of the camera in a case that an open angle of the first display screen 10 is greater than or equal to a preset threshold and an open angle of the transparent light-emitting diode is within a preset range, the transparent light-emitting diode display screen 111 is configured to display information related to an image collected by the camera after the image is identified by the control system 12.

The preset threshold may be 180 degrees, and the preset range may be 80 degrees to 120 degrees. A case that an open angle of the first display screen 10 is 360 degrees is taken as an example in FIG. 3. The transparent light-emitting diode display screen 111 may include a camera. In a case that the open angle of the first display screen 10 is greater than or equal to the preset threshold and the open angle of the transparent light-emitting diode display screen 111 is approximately 90 degrees, an image of an object behind the transparent light-emitting diode display screen 111 may be collected by the camera, and the image is sent to a processor, then the image is identified by the processor, and information related to the image is displayed at a position corresponding to an object in the image on the transparent light-emitting diode display screen 111 if the information related to the image is prestored in the system.

Of course, the preset threshold described above and the open angle of the transparent light-emitting diode display screen 111 are not limited in the embodiment, both of which may be particularly set according to an practical application scenario of the electronic device.

Figure 4:
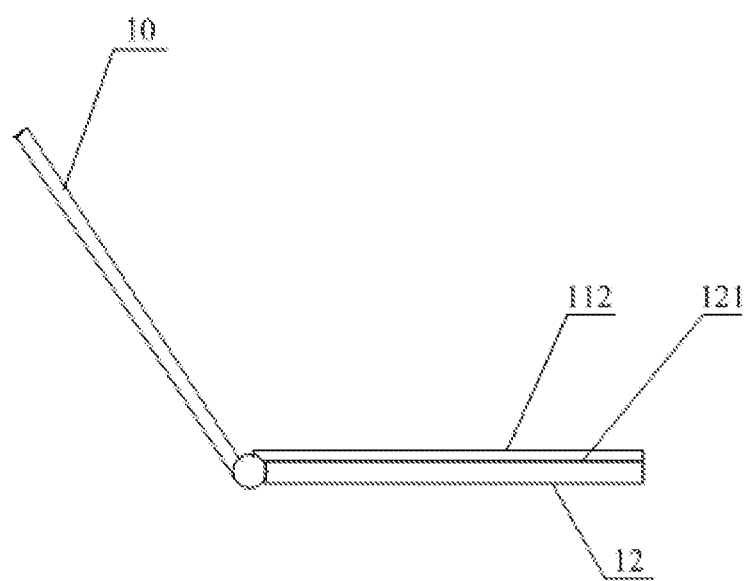
FIG. 4 is a schematic diagram showing another display status of an electronic device according to an embodiment of the disclosure.

FIG. 4 is a schematic diagram showing another display status of an electronic device disclosed in the embodiments of the disclosure. As shown in FIG. 4, in a schematic example, the second display screen is a transparent touch display screen 112.

In a case that the transparent touch display screen is fixed onto an input apparatus 121 of the control system 12, the transparent touch display screen is configured to display an image of the input apparatus 121, receive triggering information about triggering made to the image by a user, and then send the triggering information to the control system 12 to make operating information of the user identified by the control system 12 according to the triggering information and the correspondence between the image and the input apparatus 121.

The user may trigger the image in multiple ways such as a capacitive triggering way, an infrared triggering way and an ultrasonic triggering way, which are introduced subsequently as follows.

In a case that the triggering information of triggering made to the image by the user is capacitive triggering information, a transparent conductive film (i.e. Indium Tin Oxide (ITO)) is provided on the transparent touch display screen 112, the ITO film may be provided respectively on both sides of the transparent touch display screen 112, then both sides of the transparent touch display screen may receive a touch operation. The capacitive touch display screen is maturely applied in the prior art, which is not described in detail here any more.

In a case that the triggering information of triggering made to the image by the user is infrared triggering information, several infrared transmitters may be provided around the input apparatus 121 of the electronic device, an infrared net in a grid-like shape may be formed by infrared rays transmitted by the infrared transmitters; the electronic device will store a key of the input apparatus 121 corresponding to each intersection of the infrared rays in the infrared net. Thus, when a certain operation is triggered by the user on the transparent touch display screen, a certain intersection in the infrared net will be blocked; an operation which the user wants to carry out may be determined by the electronic device according to the correspondence between the intersection and the key of the input apparatus 121.

In a case that the triggering information of triggering made to the image by the user is ultrasonic triggering information, several ultrasonic transmitters may be provided around the input device 121 of the electronic device. When a certain operation is triggered by the user on the transparent touch display screen, a certain ultrasonic will be blocked and a feedback wave is produced and is received by a ultrasonic transmitter, the electronic device may then determine an operation position of the user and an operation corresponding to the operation position according to information related to the feedback wave. The ultrasonic touch display screen is maturely applied in the prior art, which is not described in detail here any more.

Figure 5:
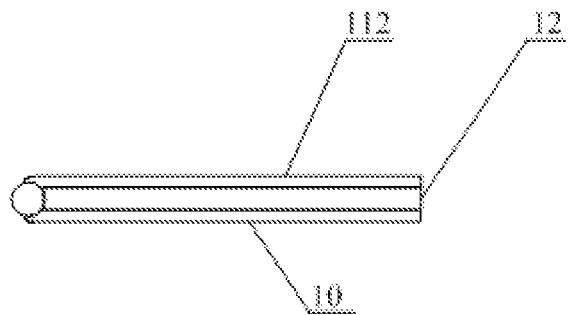
FIG. 5 is a schematic diagram showing another display status of an electronic device according to an embodiment of the disclosure.

FIG. 5 is a schematic diagram showing another display status of an electronic device according to an embodiment of the disclosure. As shown in FIG. 5, in a schematic example, the second display screen is a transparent touch display screen 112.

In a case that an open angle of the first display screen 10 reaches 360 degrees and the transparent touch display screen 112 is fixed onto the input apparatus 121 of the control system 12, the transparent touch display screen 112 may also be configured to display page information, receive a triggering operation of the user, and display corresponding page information after a corresponding operation is performed by the control system 12. In this embodiment, the electronic device may serve as a tablet computer to provide service to the user.

Figure 6:
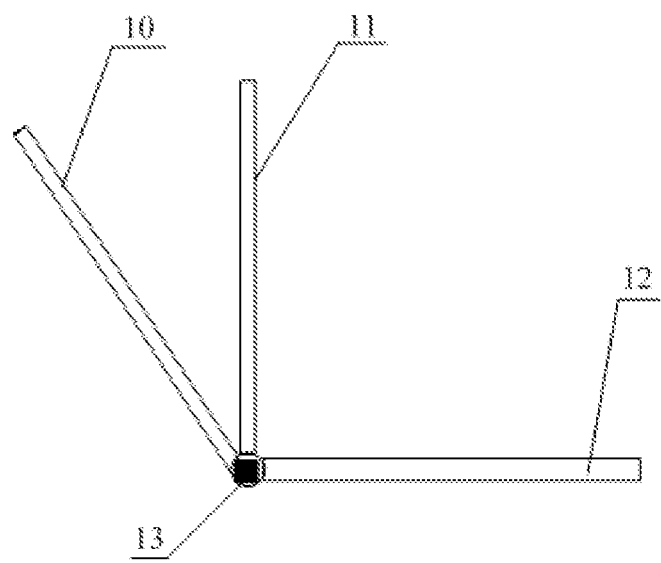
FIG. 6 is a schematic structural diagram of an electronic device with a Hall-effect switch disclosed in the embodiments of the disclosure.

In other embodiments, the electronic device may further include: two hall-effect switches 13 (a black part), where a first hall-effect switch corresponding to the first display screen 10 and a second hall-effect switch corresponding to the second display screen 11. As shown in FIG. 6, FIG. 6 is a schematic structural diagram of an electronic device having a hall-effect switch provided according to an embodiment of the disclosure.

The two hall-effect switches 13 is configured to sense an open angle of the first display screen 10 and an open angle of the second display screen 11 respectively, and to control a display mode of the first display screen 10 and a display mode of the second display screen 11 according to different combinations of the open angle of the first display screen 10 and the open angle of the second display screen 11.

In particular, the two hall-effect switches 13 may be provided at a position where the display screen sensed by the two hall-effect switches 13 is articulated to the control system 12. Considering the rotation of the first display screen 10 and the second display screen 11, the two hall-effect switches may be respectively provided at two ends of an articulation shaft.

A display mode of the first display screen 10 and a display mode of the second display screen 11 may be determined according to different combinations of sensing results of the two hall-effect switches. For example, in a case that the open angle of the first display screen 10 reaches 360 degrees, that is, the first display screen 10 rotates to a lower part of the control system 12, and an open angle of the second display screen 11 is 90 degrees, and the second display screen is a transparent display screen, then a first hall-effect switch 13 senses that the open angle of the first display screen is 360 degrees, and a second hall switch 13 senses that the open angle of the second display screen 11 is 90 degrees, the current display mode is controlled to be that the first display screen 10 does not operate and the second display screen 11 is in an Augmented Reality (AR) operating mode. Also, for example, in a case that an open angle of the first display screen 10 is the same as that of the second display screen 11 and both the open angles are within a certain fixed range, the first hall-effect switch and the second hall-effect switch control the first display screen 10 and the second display screen 11 to be in a hybrid display mode.

Of course, in a case that the open angle of the first display screen 10 and the open angle of the second display screen 11 are fixed, two or more display modes may be realized by both the first display screen 10 and the second display screen 11. For example, in a case that the open angle of the first display screen 10 is the same as that of the second display screen 11, the first display screen 10 and the second display screen 11 may operate in a hybrid display mode, and may also operate in a background display mode, that is, the first display screen 10 provides a color background to the second display screen 11. In this case, the two hall-effect switches may not determine which display mode wanted by the user is the first display screen 10 and the second display screen 11 to operate in, then the user is prompted to determine an operation mode which he wants by software, or firstly to switch to a display mode which can be realized in current state according to a preset rule. It is not necessary for the user to change the display mode if the switched display mode is a display mode which the user wants; The user can control the first display screen 10 and the second display screen 11 to switch to the display mode which the user wants via software if the display mode is not the display mode which the user wants.

Of course, a corresponding display mode may also be chosen by the user via software if the electronic device does not include the hall-effect switch.

In this embodiment, the electronic device includes the first display screen and the second display screen, the first display screen and the second display screen are articulated to the same side of the control system 12, and can rotate up and down, and can display the same or different page information according to the selection of the user. The two display screens of the electronic device can display page information for the user in multiple display forms and display modes, the display manner is greatly enriched and user's experience is improved.

The various embodiments in this specification are described herein in a progressive manner, with the emphasis of each of the embodiments on the difference between one and the other embodiments; hence, for the same or similar parts between the various embodiments, one can refer to the other embodiments. For the devices disclosed in the embodiments, the description thereof is simple since they correspond to the methods disclosed in the embodiments, the related parts can refer to the description of the methods parts.

It should also be illustrated that a relationship term such as "the first" and "the second" herein is only used to distinguish one entity or operation from another entity or operation, and does not necessarily require or imply that there is an actual relationship or sequence between these entities or operations. Furthermore, terms "include", "comprise" or any other variations are intended to cover non-exclusive "include", so that an object or an equipment including a series of factors not only include the series of factors, but also include other factors not explicitly listed, or also include inherent factors of the object or the equipment. Without more limitation, a factor defined in a sentence "include one . . . " does not exclude a case that there is also another same factor in the object or the equipment including the described factor.

The above description of the embodiments of the disclosure enables the disclosure to be implemented or used by those skilled in the art. Various modifications to these embodiments will be apparent to those skilled in the art, and the general principle defined herein can be implemented in other embodiments without departing from the spirit and the scope of the disclosure. Therefore, the disclosure will not be limited to the embodiments described herein, but in accordance with the widest scope consistent with the principle and the novel features disclosed herein.

The invention claimed is:

1. An electronic device, comprising a first display screen and a transparent touch light-emitting diode display screen;
   wherein a side of the first display screen and a side of the transparent touch light-emitting diode display screen are both attached to a same side of a control system;
   the transparent touch light-emitting diode display screen comprising a camera, the camera being configured to, in a case that a first open angle of the first display screen is greater than or equal to a preset threshold and a second open angle of the transparent touch light-emitting diode display screen is within a preset range:
      (i) collect an image of an object behind the transparent touch light-emitting diode display screen; and
      (ii) send the image to the control system to be identified, and
   the transparent touch light-emitting diode display screen being configured to, after the image is identified by the control system and it is determined that information related to the image is prestored in the control system, display the information related to the image at a position corresponding to the object in the image;
   wherein the first display screen and the transparent touch light-emitting diode display screen are configured to cooperate with each other to display page information in the case that the first open angle of the first display screen is the same as the second open angle of the transparent touch light-emitting diode display screen; and
   wherein the transparent touch light-emitting diode display screen is configured to, in the case that the transparent touch light-emitting diode display screen is fixed onto an input apparatus:
      (i) display an image of the input apparatus of the control system;
      (ii) receive triggering information of triggering made to the image; and
      (iii) send the triggering information to the control system to make an operation identified by the control system according to the triggering information and correspondence between the image and the input apparatus,
   wherein the first display screen is an electronic paper screen, and the first display screen is rotatable about an axis at the articulation position and is fixable at any position within a rotation range of the first display screen, and
   wherein the transparent touch light-emitting diode display screen is a transparent touch organic light-emitting diode display screen, and the transparent touch organic light-emitting diode display screen is rotatable about the axis at the articulation position and is fixable at any position within a rotation range of the transparent touch organic light-emitting diode display screen.

2. The electronic device according to claim 1, wherein the first display screen is configured to display first page information; the transparent touch light-emitting diode display screen is configured to display second page information; and the first page information is different from the second page information.

3. The electronic device according to claim 1, wherein the transparent touch light-emitting diode display screen is configured to display page information; and the first display screen is configured to provide a color background to the transparent touch light-emitting diode display screen.

4. The electronic device according to claim 1, wherein the triggering information comprises:
   capacitive triggering information, infrared triggering information or ultrasonic triggering information.

5. The electronic device according to claim 1, wherein, the first display screen and the transparent touch light-emitting diode display screen are configured to, in a case that both the first display screen and the transparent touch light-emitting diode display screen are in an operating state, display page information, and the page information displayed by the first display screen and the transparent touch light-emitting diode display screen is the same or different according to a selection signal of a user.

\* \* \* \* \*